United States Patent [19]

Vögele et al.

[11] 4,327,822
[45] May 4, 1982

[54] WEDGING-TYPE FREEWHEELING CLUTCH

[75] Inventors: Richard Vögele, Altlussheim; Günter Lanzerath, Wieblingen, both of Fed. Rep. of Germany

[73] Assignee: Borg-Warner Corporation, Chicago, Ill.

[21] Appl. No.: 970,589

[22] Filed: Dec. 18, 1978

[30] Foreign Application Priority Data

Dec. 30, 1977 [DE] Fed. Rep. of Germany ....... 2758841

[51] Int. Cl.³ ............................................. F16D 41/07
[52] U.S. Cl. ................................... 192/41 A; 192/45.1
[58] Field of Search ............. 192/41 A, 45, 45.1, 192/46

[56] References Cited

U.S. PATENT DOCUMENTS

| | | | |
|---|---|---|---|
| 1,542,040 | 6/1925 | De Lavaud | 192/41 A |
| 2,342,227 | 2/1944 | Swenson | 192/45.1 |
| 2,388,424 | 11/1945 | Lund | 192/45.1 |
| 2,691,435 | 10/1954 | Klamp | 192/45.1 |
| 3,022,875 | 2/1962 | Davis | 192/45.1 |
| 3,049,205 | 8/1962 | Ferris et al. | 192/45.1 |
| 3,194,368 | 7/1965 | Benson et al. | 192/45 |
| 3,207,278 | 9/1965 | Titt | 192/45.1 |
| 3,380,563 | 4/1968 | Bowers et al. | 192/45.1 X |
| 3,718,212 | 2/1973 | Havranek | 192/45 |
| 3,730,316 | 5/1973 | Zimmer | 192/41 A |
| 3,776,335 | 12/1973 | Cadet | 192/41 A |
| 3,938,632 | 2/1976 | Giese et al. | 192/41 A |
| 3,952,849 | 4/1976 | Brownhill et al. | 192/41 A |
| 4,089,395 | 5/1978 | Fogelberg | 192/41 A |

FOREIGN PATENT DOCUMENTS 1060670 7/1959 Fed. Rep. of Germany .

*Primary Examiner*—Allan D. Herrmann
*Attorney, Agent, or Firm*—James A. Geppert

[57] ABSTRACT

A wedging-type freewheeling clutch providing a combination of a roller or needle bearing with a wedging member freewheeling clutch in generally axial alignment between inner and outer rings. A ball bearing may also be added on the opposite side of the freewheeling clutch from the roller or needle bearing. The needle or roller bearing includes a cage open on one side to receive the rollers and the cage of the freewheeling clutch is located adjacent to the bearing cage to close the open side. The cage for the freewheeling clutch is a double cage having centering means on either the inner or outer surface of the cage to contact the adjacent ring to center the clutch relative to the bearing races.

7 Claims, 6 Drawing Figures

WEDGING-TYPE FREEWHEELING CLUTCH

BACKGROUND OF THE INVENTION

The present invention relates to a wedging-type freewheeling clutch having an inner ring and an outer ring with wedging members arranged between the rings and carried in a cage, combined with a roller bearing and/or a ball bearing.

Frequently, freewheeling clutches are required to transmit a large torque and to include bearing properties for absorbing large radial and axial forces although the space requirements of the clutch are minimal. The requirement for small dimensions in freewheeling clutches yield technical problems in the realization of the freewheeling couplings. Thus, for example, with a wedging member height of only a few millimeters, a uniform positioning of the wedging members on the outer and inner rings should be ensured.

Underlying the invention is the problem of providing a wedging-type freewheeling clutch with suitable bearing properties which provide optimum characteristics of bearing loadability, transferrable torque and outer dimensions. It should be possible to produce the clutch with commercially available bearings, in particular a needle bearing, by simple reconstruction of the clutch in correspondence to the respective requirements. Through this invention, a freewheeling clutch is formed having both coupling properties and bearing properties simultaneously.

German Pat. No. 1,060,670 discloses a known construction of a roller bearing having a freewheeling locking mechanism wherein a bearing of otherwise conventional construction has several cage pockets accommodating blocking rolls. According to the teaching of the patent, any conventional roller bearing can be used without further modification as a freewheeling locking mechanism through the removal of a few roll bodies and replacement with blocking rolls to bring about blocking into the freed cage pockets. The surfaces on the outer and inner rings simultaneously form the running paths of the roller bearing and the counter-clamping surfaces for the blocking rolls. Such a construction, however, has the disadvantage that the running tracks of the rings are deformed by the high pressure of the blocking rolls pressing on local areas. Small deformations or damages are intensified during operation by the rollers impacting the deformations and may lead to premature failure of the freewheeling clutch.

SUMMARY OF THE INVENTION

The solution of the problem posed above is achieved by the use of a separate cage for the roller and/or ball bearings in a freewheeling clutch of the type previously mentioned, the cage preferably formed of a plastic, and the cage for the wedging members or clamping bodies is a double cage with an internally positioned spring band.

It is preferable to have the freewheeling clutch formed utilizing the combination of needle bearings with the wedging members where especially small dimensions are necessary. The widths of the inner and outer rings considerably exceed the widths of the wedging members in this new clutch, and the free space present between the rings after the insertion of the wedging members accommodates a separate cage for needles for the formation of a needle bearing. In order to obtain a combined needle bearing—freewheeling clutch, the cage and needles of a standard needle bearing can be shortened, and a cage is utilized with wedging members whose clamping height is slightly greater than the diameter of the needle bearing. The wedging members lie beside the needle bearing, whereby the advantage that the clamping surfaces used by the wedging members do not serve simultaneously as running surfaces for the needle bearing is achieved, so that damage to the bearing surfaces by the wedging members is avoided. The shortening of the needles has, furthermore, the advantage that the shorter needles tend to have less end wear than longer rollers in the absorbing of a skewing moment. With an arrangement of the needles adjacent the wedging members, the needles can be inserted into the needle cage which is open at one side and the cage holding the wedging members is located adjacent the open side of the needle cage. The wedging member cage forms, in this arrangement, the closure of the needle cage at its open end, whereby a saving in space is achieved. Although the above statements relate to needle bearings, they are valid for roller bearings by suitable modifications.

Depending on the field of use for the freewheeling clutch, the present invention comprehends arrangements where roller or needle bearings are positioned adjacent the opposite sides of the wedging member cage, or the needle or roller bearings can have wedging member cages adjacent each side thereof. In this manner, the roller or needle bearings combined with the wedging members can be adapted to high bearing forces and/or clamping forces.

If the combination of a bearing and a freewheeling clutch is also to absorb axial forces, then there is the possibility of using a commercially available combined needle and annular groove ball bearing. A cage of shortened structural length with the needles or rollers is utilized, and the cage with the wedging members is inserted into the freed space between the rings of the bearing. Thus, a preferred embodiment of the invention is achieved wherein a needle bearing, a ball bearing and a wedging-type clutch are integrally joined over the rings of the bearing. Through the use of commercially available combined radial-axial bearings that are additionally provided with wedging members, an extremely space-saving clutch is achieved that is simple in assembly. Besides minimal structural volumes, a saving in material, and the best possible precision, these bearing clutch combinations can be easily adapted to particular clutch requirements.

Expedient further developments of the invention are yielded through the feature that the wedging member cage which simultaneously forms the closure for the needle cage is formed of plastic and is centered with a centering means located on the inner or outer ring.

The use of the needle cage open on one side results in a simple assembly, lower tool costs and a saving of space. Also, the wedging member cage made of a plastic material has good damping properties for the wedging members retained therein.

An improvement in the uniform load absorption of individual wedging members is achieved if the cage for the wedging members is formed as a double cage. Through a centering of the cage on the inner or outer ring by means of centering surfaces extending in an axial direction over the entire width of the cage, an excellent cage centering is achieved that ensures a good wedging member guidance and good synchronous running of all of the wedging members. Moments such as arise in wedging member cages with oneside guide borders are avoided. A positive or frictional juncture between the cage and the inner and outer rings provides a good braking of the cage.

The preferred process for the production of a wedging-type freewheeling coupling according to the present invention is that in a needle bearing absorbing radial force, a cage with needles of shortened structural length is inserted, and the resulting free space is filled with a cage containing the wedging members. The needle bearing can also be integrally joined with an annular groove ball bearing absorbing axial forces. In a simple manner, accordingly, a wedging-type freewheeling clutch can be installed in a commercially available needle bearing which additionally imparts coupling properties to the bearing.

DESCRIPTION OF THE PREFERRED EMBODIMENTS

Figure 1:
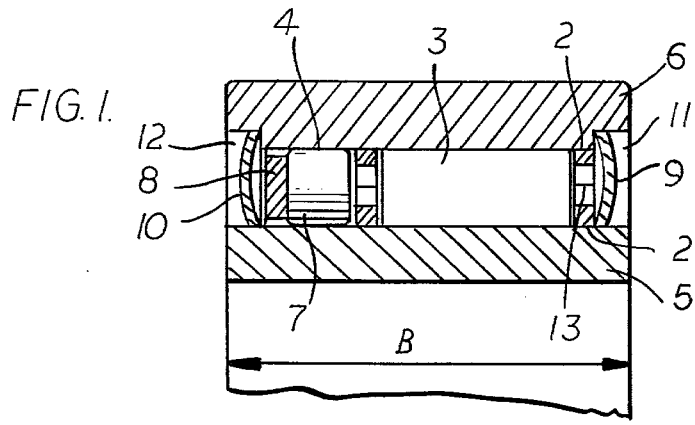
FIG. 1 is a partial cross sectional view through a freewheeling clutch with wedging members and roller bearings.

In FIG. 1, there is shown in section the simplest form of execution of the invention, in which a wedging-type freewheeling coupling or clutch is formed by a double cage 2 with wedging members 3, a roller bearing 4, an inner ring 5 and an outer ring 6. The rollers 7 of the roller bearing 4 are held in a cage 8 open on one side. The wedging member cage 2 and the roller cage 8 are retained by security rings 9 and 10 which are inserted in corresponding recesses 11 and 12 at the opposite sides of the clutch. The width of the coupling is indicated at B. In view of the symmetry of the coupling, only the upper half of the clutch is shown. The double cage 2 is provided with a spring band 13 positioned within the cage.

Figure 2:
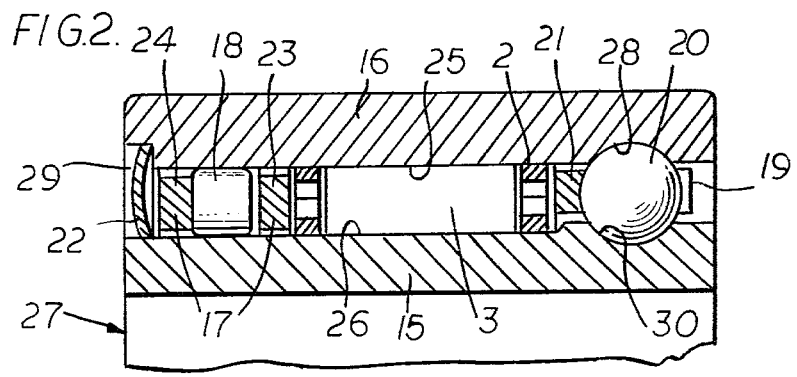
FIG. 2 is a partial cross section view through a freewheeling clutch which contains a cage with wedging members, a roller bearing and an annular groove ball bearing.

The preferred embodiment of the wedging-type freewheeling clutch 27 is shown in FIG. 2. Between the inner ring 15 and the outer ring 16, there is arranged a double cage 2 containing wedging members 3, a cage 17 with rollers 18 therein, and a ball bearing cage 19 with balls 20. The subdivision into three individual cages makes possible independent movements of the three cages 2, 17 and 19 in the peripheral direction. This is necessary because of the different turning speeds of the cages for a faultless functioning of the clutch. In order to optimize the sliding of the double cage 2 containing the wedging members 3 relative to the cage 19 having the balls 20, the ball cage 19 includes an inwardly directed slide rim 21 which lies adjacent to the double cage 2. The ball cage 19 has an open side on the side opposite to the slide attachment 21, and the cages are secured against axial shifting by a security ring 22. The roller cage 17 consists of two symmetrical halves 23 and 24.

The wedging members 3 are inserted between the inner ring 15 and the outer ring 16 in such a way that they utilize the running surfaces 25 and 26 on the rings, ordinarily provided for needles, as clamping surfaces. The wedging-type freewheeling clutch 27 can serve as a flyback suppressor or overriding clutch and, in the process, simultaneously absorb radial and axial bearing forces. The outer ring 16 is provided with an annular groove running surface 28 and a recess 29 at the opposite side to receive a security ring 22. The inner ring 15 has an annular groove running surface 30 and the remaining part of the inner ring is formed as an offset inner surface 26 which is available for the wedging members 3 and the rollers 18.

Figure 3:
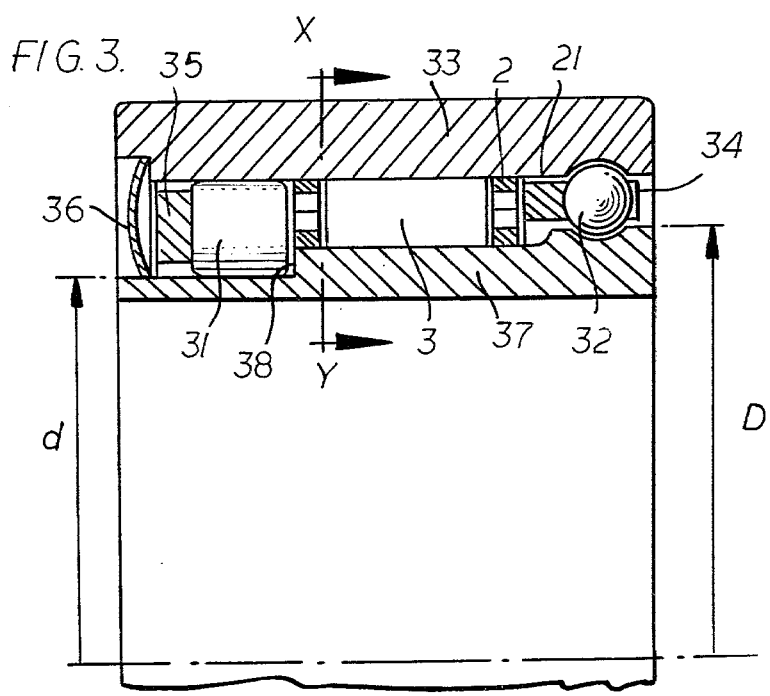
FIG. 3 is a partial cross sectional view of another form of freewheeling clutch.

In FIG. 3, there is shown in section the construction of a wedging-type freewheeling clutch in which the rolling circles of the rollers 31 and of the balls 32 differ substantially in their diameters d and D, respectively, so that the peripheral velocities of the cages vary substantially. Such a form of execution of a clutch becomes possible through the present invention. This clutch has a number of advantages, including that it is possible to adapt to very different load conditions in construction by the optimum selection of the individual bearings (roller or ball bearings). Furthermore, this clutch avoids the disadvantage of possible roller slippage due to the manufacturing tolerances in the assembly.

The outer ring 33, the cage 34 for the balls 32, the double cage 2 with the wedging members 3, the cage 35 open at one end to receive the rollers 31 and the security ring 36 all correspond in their formation with the parts described for FIGS. 1 and 2. The inner ring 37, however, is offset in the region of the rollers 31 and their cage 35 on the outer periphery in order to receive the enlarged rollers 31. The edge or shoulder 38 formed by the offset on the inner ring 37 serves as a stop for the roller cage 35.

Figure 4:
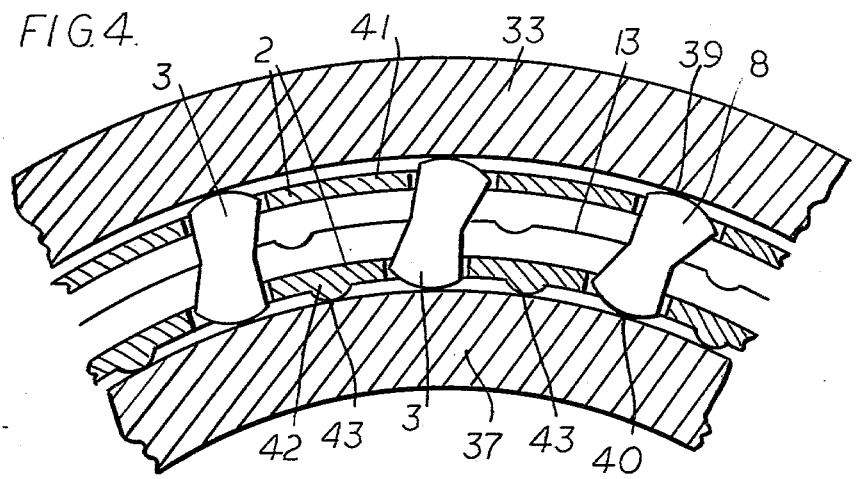
FIG. 4 is a partial cross sectional view taken on the line X-Y of FIG. 3.
Figure 5:
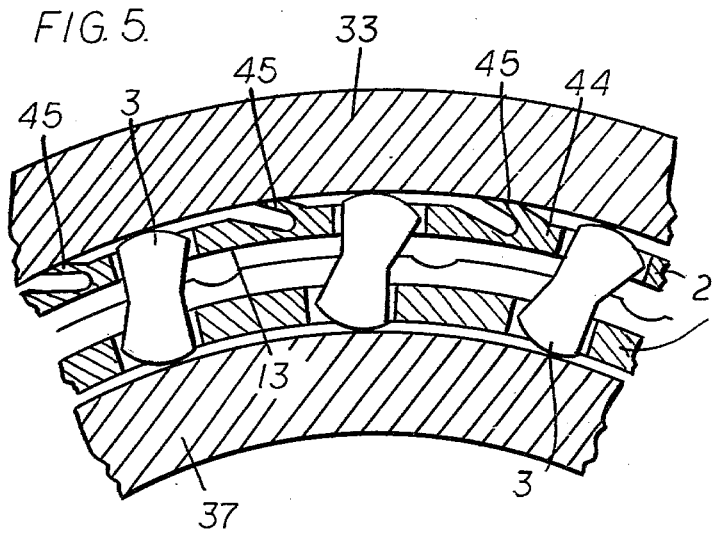
FIG. 5 is a partial cross sectional view similar to FIG. 3 but showing centering means on the outer ring.

FIG. 4 discloses in section, along the line X-Y of FIG. 3, an enlarged view in part of the inner ring 37 and the outer ring 33 having the double cage 2 disposed in between with the wedging members 3. The wedging members 3 are enclosed on their inner and outer ends 39 and 40, respectively, by a respective cage part 41 and 42. Between the cage parts 41 and 42, there is inserted in a known manner a spring 13 for the springing of the wedging members 3. On the inner cage part 42 are arranged a plurality of transverse straps 43 axially extending and frictionally engaging inner ring 37, which serve to center the cage 2 relative to the inner ring. Another embodiment of centering means for the cage 2 is shown in FIG. 5. In the embodiment of FIG. 5, the outer part 44 of the cage 2 is provided with the outwardly projecting tongues 45 which engage the interior surface of the outer ring 33.

Figure 6:
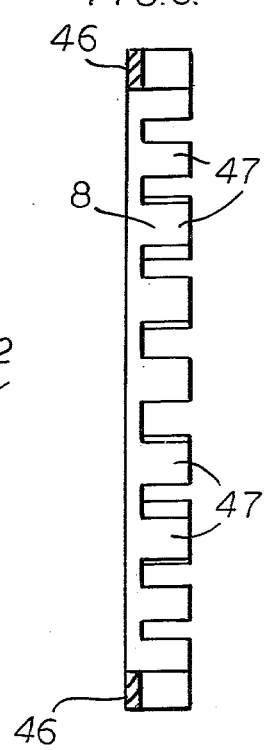
FIG. 6 is a cross sectional view through a needle cage open on one side used in the present invention.

In FIG. 6, a cage 8 is shown in section which is open along one side to receive the rollers or needles. This cage 8 has a closure ring 46 on only one side on which are arranged the laterally projecting straps 47 for the support of the individual rollers or needles.

By the provision of the number of rollers or needles, the choice of the diameter and the length of the rollers or needles, the number of balls in the annular groove ball bearing and the arrangement and design of the wedging members the freewheeling clutch can be adapted to special requirements.

We claim:

1. A wedging-type freewheeling clutch comprising an inner ring and an outer ring with wedging members arranged between the rings and retained in a double cage which is provided with axially extending centering means frictionally engaging one of the rings and which has a spring band located in the cage, the width of the inner and outer rings being greater than the length of the wedging members, a plurality of ball bearings located between said rings, and a separate cage housing the ball bearings formed of plastic and having an inwardly directed slide rim.

2. A freewheeling clutch according to claim 1 wherein a needle bearing cage is positioned on the side of the wedging member opposite from the side that the ball bearings are positioned.

3. A freewheeling clutch according to claim 2 including needle bearings retained in a cage comprising two symmetrical cage halves.

4. A freewheeling clutch according to claim 2 wherein the needle bearings are inserted in a cage open at one side, and the wedging members are retained in a cage adjacent to the open end of the needle bearing cage.

5. A freewheeling clutch according to claim 1, wherein said ball bearings absorb axial force and are located adjacent one side of said wedging member cage with a needle bearing cage on the opposite side.

6. A freewheeling clutch according to claim 5, in which said axial force absorbing bearing is an annular groove ball bearing.

7. A freewheeling clutch as set forth in claim 1, in which the wedging member cage is formed of plastic.

* * * * *